UNITED STATES PATENT OFFICE.

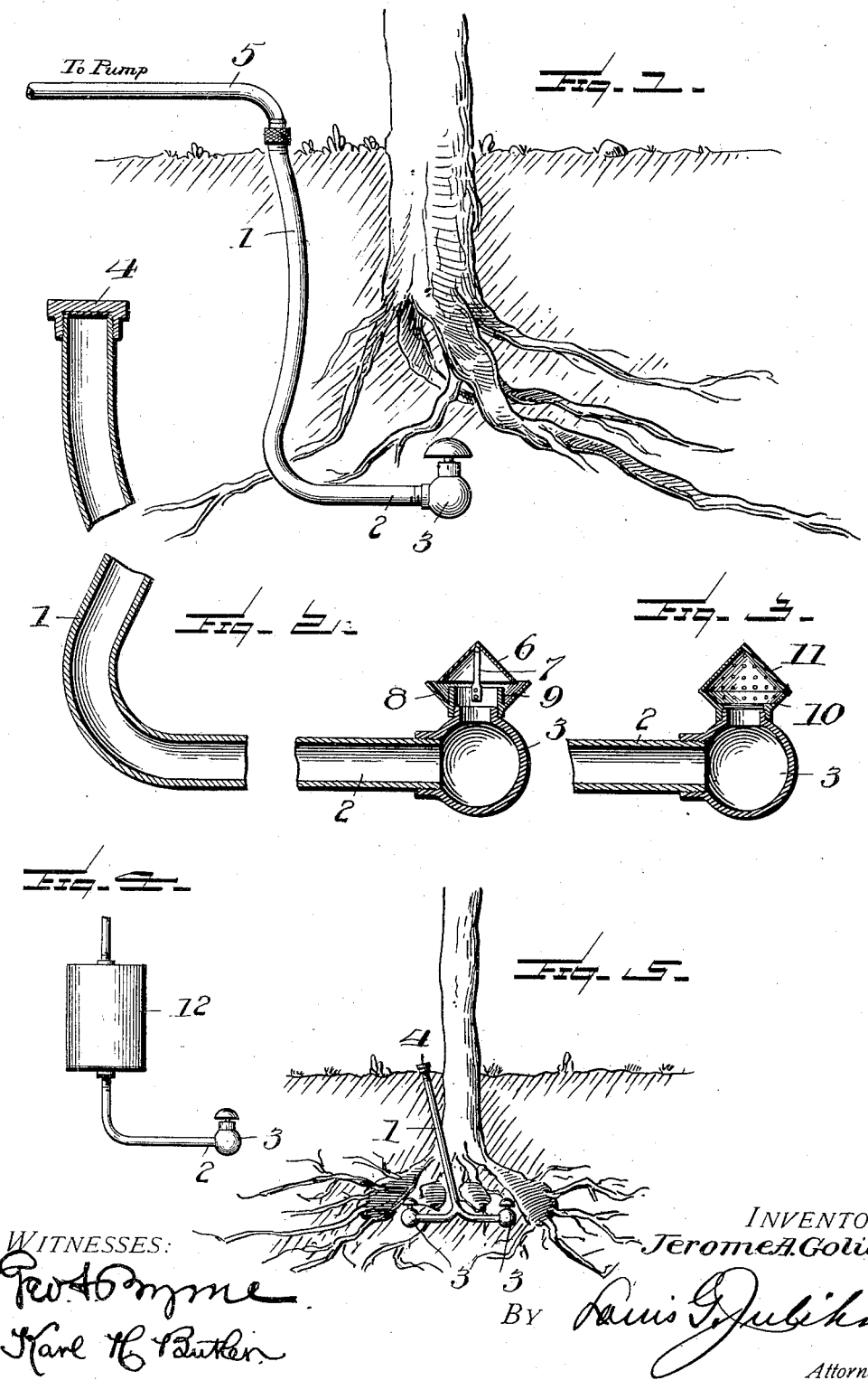

JEROME AGUSTUS GOLIBART, OF SYKESVILLE, MARYLAND.

ROOT-IRRIGATING DEVICE.

SPECIFICATION forming part of Letters Patent No. 656,887, dated August 28, 1900.

Application filed April 9, 1900. Serial No. 12,187. (No model.)

*To all whom it may concern:*

Be it known that I, JEROME AGUSTUS GOLIBART, a citizen of the United States, residing at Sykesville, in the county of Carroll and State of Maryland, have invented certain new and useful Improvements in Root-Irrigating Devices; and I do hereby declare the following to be a full, clear, and exact description of the invention, such as will enable others skilled in the art to which it appertains to make and use the same.

My invention relates to a novel root-irrigating device; and one object is to produce a simple and effective apparatus or attachment designed to be embedded in the ground when a tree or other plant is set out and by means of which the roots may be properly watered at any time, either while the plant is becoming set or after it has become well rooted.

A further object of the invention is to produce a device which while ordinarily intended for irrigating purposes may be employed as an insecticide-distributer when it is desired to saturate the ground adjacent to the roots with a powder or liquid insecticide for the destruction of grubs or other insects attacking the roots.

To the accomplishment of the foregoing objects, my invention consists, primarily, in an irrigator comprising a metal pipe, tube, or conduit provided with a discharge end designed to extend under the bulb of the root and with its opposite extremity extending above the ground and designed to receive the water or insecticide, as the case may be, which is designed for discharge below the root.

Secondarily, the invention consists in certain details of construction and arrangement hereinafter described, and illustrated in the accompanying drawings.

Referring to said drawings, Figure 1 is a general view illustrating the application of the simplest embodiment of my invention. Fig. 2 is a detail view of a modified form of my device; Fig. 3, a similar view of another modification. Fig. 4 is a view of the device comprehending a receiving-reservoir, and Fig. 5 is a view illustrating the application of a modified form of my device.

Referring to the numerals of reference indicating corresponding parts and structural features in the several views, 1 indicates a tube designed to lie close against the stalk or trunk of a plant or tree and having its lower end deflected laterally, as indicated at 2, to bring the terminal discharge-nozzle 3 underneath the bulb of the root. The upper end of the tube 1 is preferably threaded for the reception of a screw-cap 4, located above the ground, and the discharge-nozzle 3 is disposed at an angle with respect to the portion 2 of the tube to cause it to discharge water or insecticides against the roots from below.

The device constructed as thus far described comprehends a complete embodiment of my invention in its broadest aspect. The attachment having been planted with the tree and being located and arranged as shown in Fig. 1 of the drawings it is simply necessary to remove the cap 4 and pour the liquid into the upper end of the tube, from whence it is discharged against or in proximity to the roots through the discharge end or nozzle 3. If it is desired to supply the water or insecticide under pressure, this may be accomplished by the use of any ordinary form of force-pump coupled by any suitable means to the upper or receiving end of the tube 1—as, for instance, through the medium of a flexible or other hose 5, fitted to the upper end of the tube. Inasmuch, however, as it is desirable under some circumstances to protect the discharge end or nozzle from the ingress of dirt or other debris which might render the supply of liquid comparatively ineffective, I have devised simple expedients to effect this end. As shown in Fig. 2 of the drawings, this protective means comprises a conical cap 6, centered and supported above the discharge-opening—as, for instance, by a spider 7—and of sufficiently-greater diameter than the tube to leave an annular opening 8 between the base of the cap and the wall of the tube to permit free egress of liquid from the latter. The opening 8 is in turn protected by an inclined annular shield 9, secured in any suitable manner to the tube adjacent to the discharge end and having a maximum diameter coincident with the diameter of the base of the cap. It will be seen that as the tree or plant develops the growth and ramifications of the roots may force the discharge end of the tube either up or down without causing the soil to be packed within the discharge orifice in a manner to materially interfere with the effective distribution of the liquid.

In Fig. 3 of the drawings I have shown a modification of the protecting means, comprising a flared perforate extremity or discharge end 10, covered by a perforated conical cap 11, having its edge seated upon and secured to the edge of the flared end. This construction therefore comprehends a terminal numerously-perforated nozzle comprising oppositely-disposed cones. If the device constructed in this manner is pushed upward by the roots, the soil adjacent to the perforations in the flared end 10 will be loosened to permit the ready absorption of the liquid, while the reverse or downward movement of the tube will have the same effect upon the soil adjacent to cap 11.

In Fig. 4 of the drawings I have shown the tube provided with a receiving-reservoir 12, in which water or a pungent insecticide may be stored.

From the foregoing it will be observed that I have invented a simple, inexpensive, and effective expedient for irrigating the roots of trees or plants or for exterminating insect-life which threatens proper growth and development of vegetation; but while the present embodiment of my invention appears at this time to be preferable I do not desire to limit myself to the structural details defined, but reserve the right to effect such changes, modifications, and variations as may come properly within the scope of the protection prayed.

Therefore what I claim as my invention, and desire to secure by Letters Patent, is—

1. A root-irrigating device comprising a conduit beneath the surface of the ground and adjacent to the roots, said conduit having a deflected end terminating in a discharge-nozzle disposed at an angle to said end.

2. A root-irrigating device comprising a conduit beneath the surface of the ground and adjacent to the roots, said conduit having a laterally-deflected end terminating in a discharge-nozzle disposed substantially in the direction of the main portion of the conduit.

3. A root-irrigating device comprising a tube having a laterally-deflected end provided with an angular extremity forming a discharge-nozzle disposed substantially parallel to the main portion of the tube, and detachable means for closing the receiving end of said tube.

4. A root-irrigating device comprising a tube having a deflected lower end terminating in an upwardly-disposed discharge-nozzle and a protective device disposed above said nozzle.

5. An irrigating device comprising a tube having a deflected end and a conical protecting-cap carried by the tube and located beyond its end.

6. A root-irrigating device comprising a conduit having a reservoir located therein, and having a deflected lower end terminating in a discharge-nozzle disposed at an angle to said end.

In testimony whereof I affix my signature in presence of two witnesses.

JEROME AGUSTUS GOLIBART.

Witnesses:
W. F. BALDERSTON,
W. D. BUNNETT.